UNITED STATES PATENT OFFICE

WERNER LANGE, OF DESSAU-ZIEBIGK IN ANHALT, GERMANY, ASSIGNOR TO GENERAL ANILINE WORKS, INC., OF NEW YORK, N. Y., A CORPORATION OF DELAWARE

DISAZO DYES

No Drawing. Application filed April 14, 1931, Serial No. 530,139, and in Germany May 7, 1930.

My present invention relates to a process of manufacturing new disazo dyes and to the dyes obtainable by this process. More particularly it relates to yellow dyes having a remarkable affinity for cotton.

I have found that valuable yellow substantive cotton dyes are obtainable by bis-diazotizing one molecular proportion of di-(aminobenzoylamino)- or di-(aminobenzoylaminobenzoylamino)-compounds and by coupling the bis-diazo compound obtained with two molecular proportions of a single or of different yellow azo components, from which at least one bears in its molecule one or several sulfonic or carboxylic acid groups.

These dyes correspond to the general formula:

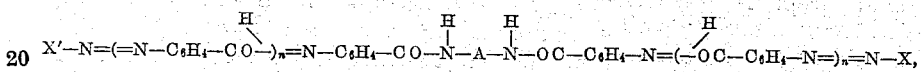

wherein A means an aromatic radical of the benzene or naphthalene series, X and X' stand for an azo component producing yellow shades of the group consisting of pyrazolones, aceto-acetic anilides, methylketol, salicyclic acid, at least one of these components bearing a sulfonic acid or a carboxylic acid group, and $n$ stands for 0 or 1.

As aromatic diamines the aminobenzoylated or aminobenzoylaminobenzoylated derivatives of which serve to prepare the bis-diazo compound, I enumerate the following:—1.4- and 1.3-diaminobenzene, 1-methyl-2.6-diaminobenzene and the sulfonic acids of these diamines, diaminostilbenes, such as, for instance, 4.4'-diaminostilbene-2.2'-disulfonic acid, diaminodiphenyl ureas, such as, for instance, 4.4'-diaminodiphenyl urea-3.3'-disulfonic acid, benzidines such as, for instance, 4.4'-diaminobenzidine-2.2'- or 3.3'-disulfonic acid. All these compounds are intended to be included into the term "diamine of the benzene series." Correspondent compounds of the naphthalene series may be derived from 1.4-, 1.3-, 1.5-, and 2.7-diamino naphthalenes and sulfonic acids thereof. These aminobenzoyl or aminobenzoylaminobenzoyl compounds are obtainable according to the well-known processes by reacting 1.3- or 1.4-nitrobenzoylchloride upon the said diamines, by reducing the nitro group, and repeating these reactions in the case of aminobenzoylaminobenzoyl derivatives.

As azo components selected in order to produce yellow dyes, the following may be mentioned by way of example: 1-(4'-sulfophenyl)-3-methyl-5-pyrazolone, phenylmethylpyrazolonecarboxylic acids such as, for instance, 1-phenyl-5-pyrazolone-3-carboxylic acid, corresponding pyrazolone compounds prepared of naphthylamine mono- or disulfonic acids, salicylic acid, derivatives of aceto acetic acids, such as acetoacetanilide sulfonic acid, acetoacet-ortho-anisidide sulfonic acid, methylketol sulfonic acid.

My invention is illustrated by the examples following hereafter, the parts being by weight:—

*Example 1.*—44.8 parts of sodium 1.4-di-(4-aminobenzoylamino)-benzene-2-sulfonate are diazotized in the usual manner in the presence of hydrochloric acid by addition of 13.8 parts of sodium nitrite. The bis-diazo compound is run into a solution of 50.8 parts of 1-(4'-sulfophenyl)-3-methyl-5-pyrazolone kept alkaline by the presence of sodium carbonate. The reaction mixture is stirred until the diazo compound is consumed; then the dye formed is separated by addition of common salt.

Probably it corresponds to the formula:

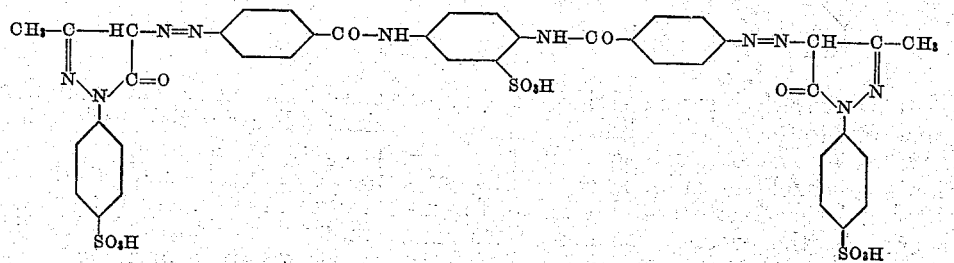

It dyes cotton vivid green-yellow tints of excellent fastness to light and acids.

*Example 2.*—By substituting for sodium 1.4-di-(4-aminobenzoylamino)-benzene-2-sulfonate the corresponding quantity of sodium 4.4'-(4-aminobenzoylamino)-diphenyl-urea-3.3'-disulfonate and by carrying out the further performance of the reaction in strict accordance with the details given in Example 1, a dye of similar qualities is obtainable.

*Example 3.*—In Example 1 the sodium 1.4-di-(4-aminobenzoylamino)-benzene-2-sulfonate is replaced by a corresponding quantity of diaminobenzoylated benzidine-2.2'-or 3.3'-disulfonate, whereat a dye of similar qualities is obtainable.

*Example 4.*—The bis-diazo compound of 44.8 parts of 1.4-di-(4-aminobenzoylamino)-benzene-2-sulfonic acid prepared as mentioned in Example 1, is made alkaline while cooling by addition of sodium carbonate. Immediately a neutral solution of 25.4 parts of 1-(4'-sulfophenyl)-3-methyl-5-pyrazolone is added and the mixture is stirred for about 1 hour until free pryazolone is no more detectable in the solution. Then a solution of 17.7 parts of aceto acetic anilide dissolved in 4 parts of sodium hydroxide and water is added and stirring is continued for a further hour until this component, likewise, is completely consumed. Then the reaction mixture is warmed and the dye is separated by addition of salt.

Probably it corresponds to the formula:

and bis-diazotized by addition of hydrochloric acid and 13.8 parts of sodium nitrite. The diazo compound is run in a cold solution of 50.8 parts of 1-(4'-sulfophenyl)-3-methyl-5-pyrazolone, alkaline by the presence of sodium carbonate. The mixture is stirred until the diazo compound is consumed. The dye is separated in the usual manner. It corresponds to the formula:

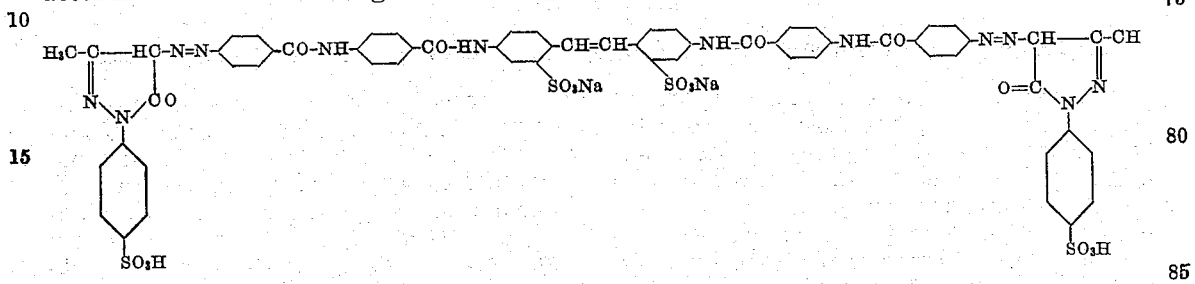

and dyes cotton yellow tints fast to the action of light.

It is obvious that my invention is not limited to the foregoing examples or to the specific details given therein. In a manner completely analogous to that given in detail in the examples, I may use one of the other aminobenzolated or aminobenzoylaminobenzoylated diamines mentioned above in preparing a bis-diazo compound and in a completely analogous manner I may couple the latter with one or two of the yellow azo components enumerated above. In the case of manufacturing disazo dyes containing in their molecule two different azo components, preferably in the first stage that component is reacted upon the dis-diazo compounds which couples more difficulty, such as, for instance, aceto-acetic anisidide sulfonic acid, methylketol sulfonic acid or salicylic acid. Then a pyrazolone compound may be coupled in the second stage, since these compounds react more freely with diazo compounds. In the case of dyes containing different end-components, preferably

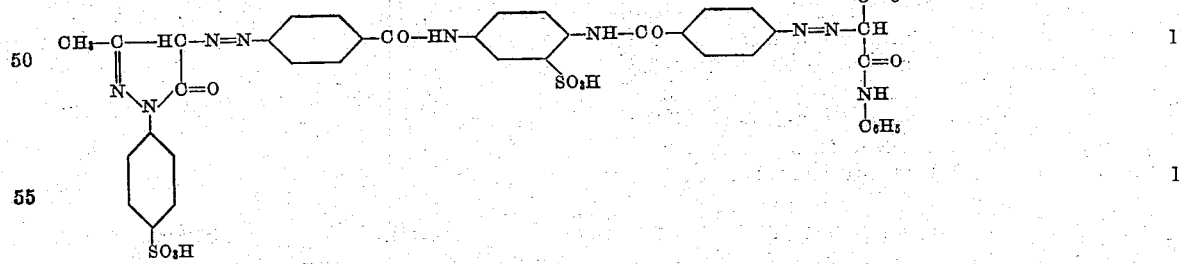

It likewise dyes cotton vivid green-yellow tints fast to the action of light.

*Example 5.*—89 parts of sodium di-(4-amino-benzol-4-aminobenzoylamin)-stilbene-2.2'-disulfonate (as obtainable, for instance, by the process disclosed in German Patent No. 252,376) are dissolved in water one of the latter is a pyrazolone derivative, since otherwise the shades obtained are too meager. A few simple comparative experiments should be made to determine the best kind of azo component or azo components to employ with a particular bis-diazo compound of the group in question.

What I claim is:—

1. As new products the disazo dyes corresponding to the general formula:

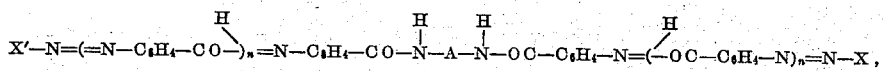

wherein A means an aromatic radicle of the benzene or naphthalene series, X and X′ stand for the radicle of an azo component producing yellow shades of the group consisting of pyrazolones, aceto-acetic anilides, methylketol, salicylic acid, at least one of these end components bearing an acid radicle of the group consisting of $-SO_3H$ and $-COOH$, and $n$ stands for 0 or 1, said dyes dyeing cotton yellow tints of excellent fastness to light.

2. As new products the disazo dyes corresponding to the general formula:

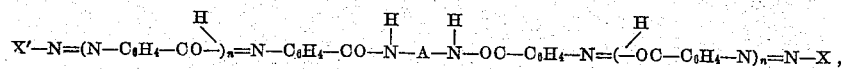

wherein A means an aromatic radicle of the benzene or naphthalene series, X means a pyrazolone radicle and X′ the radicle of an azo component producing yellow shades of the group consisting of pyrazolones, aceto-acetic anilides, methylketol, salicylic acid, at least one of these end components bearing an acid radicle of the group consisting of $-SO_3H$ and $-COOH$, and $n$ stands for 0 or 1, said dyes dyeing cotton yellow tints of excellent fastness to light.

3. As new products the disazo dyes corresponding to the general formula:

wherein A means the radicle of a benzene sulfonic acid, a diphenylurea sulfonic acid, a stilbene sulfonic acid or a diphenyl sulfonic acid, X and X′ stand for the radicle of an azo component producing yellow shades of the group consisting of pyrazolones, aceto-acetic anilides, methylketol, salicylic acid, at least one of these end components bearing an acid radicle of the group consisting of $-SO_3H$ and $-COOH$, and $n$ stands for 0 or 1, said dyes dyeing cotton yellow tints of excellent fastness to light.

4. As new products the disazo dyes corresponding to the general formula:

wherein A means the radicle of a benzene sulfonic acid, a diphenylurea sulfonic acid, a stilbene sulfonic acid or a diphenyl sulfonic acid, X means a pyrazolone radicle and X′ the radicle of an azo component producing yellow shades of the group consisting of pyrazolones, aceto-acetic anilides, methylketol, salicylic acid, at least one of these end components bearing an acid radicle of the group consisting of $-SO_3H$ and $-COOH$, and $n$ stands for 0 or 1, said dyes dyeing cotton yellow tints of excellent fastness to light.

5. As new products the dyes corresponding to the general formula:

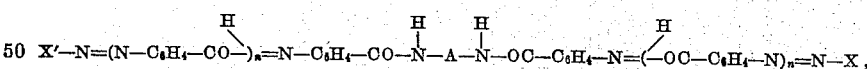

wherein A means an aromatic radicle of the benzene or naphthalene series, X and X′ stand for the radicle of an azo component producing yellow shades of the group consisting of pyrazolones, aceto-acetic anilides, methylketol, salicylic acid, at least one of these end components bearing an acid radicle of the group consisting of $-SO_3H$ and $-COOH$, and $n$ stands for 0 or 1, said dyes dyeing cotton yellow tints of excellent fastness to light.

6. As new products the dyes corresponding to the general formula:

where A means the radicle of a benzene sulfonic acid, a diphenylurea sulfonic acid, a stilbene sulfonic acid, or a diphenyl sulfonic acid, X and X′ stand for the radicle of an azo component producing yellow shades of the group consisting of pyrazolones, aceto-acetic anilides, methylketol, salicylic acid, at least one of these end components bearing an

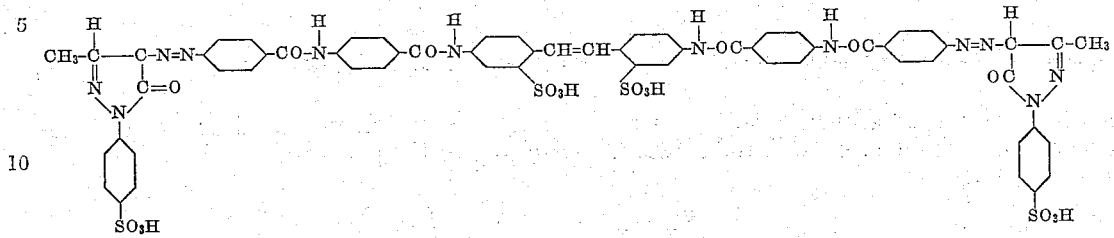

acid radicle of the group consisting of $-SO_3H$ and $-COOH$, and $n$ stands for 0 or 1, said dyes dyeing cotton yellow tints of excellent fastness to light.

7. As new products the dyes corresponding to the general formula:

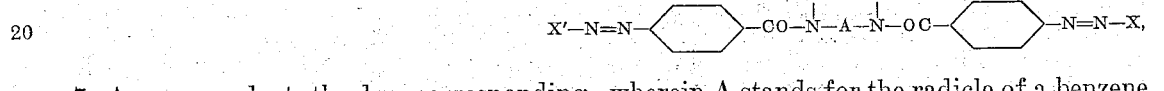

wherein A means the radicle of a benzene sulfonic acid, a diphenyl urea sulfonic acid, a stilbene sulfonic acid, or a diphenyl sulfonic acid, X stands for a pyrazolone radicle, X' stands for the radicle of an azo component producing yellow shades of the group consisting of pyrazolones, aceto-acetic anilides, methylketol, salicylic acid, at least one of these end components bearing an acid radicle of the group consisting of $-SO_3H$ and $-COOH$, and $n$ stands for 0 or 1, said dyes dyeing cotton yellow tints of excellent fastness to light.

8. As new products the dyes corresponding as free acid to the general formula:

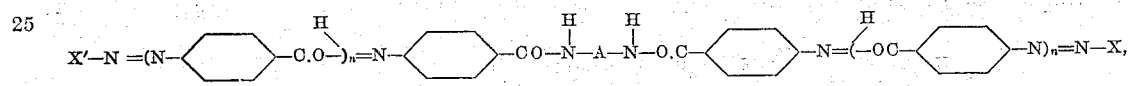

wherein A stands for the radicle of a benzene sulfonic acid, a diphenylurea sulfonic acid, a stilbene sulfonic acid or a diphenyl sulfonic acid, X' stands for the radicle of an azo component producing yellow shades of the group consisting of pyrazolones, aceto acetic anilides, methylketol, salicylic acid, and $n$ stands for 0 or 1, said dyes dyeing cotton yellow tints of excellent fastness to light.

9. As a new product the dye corresponding as free acid to the formula:

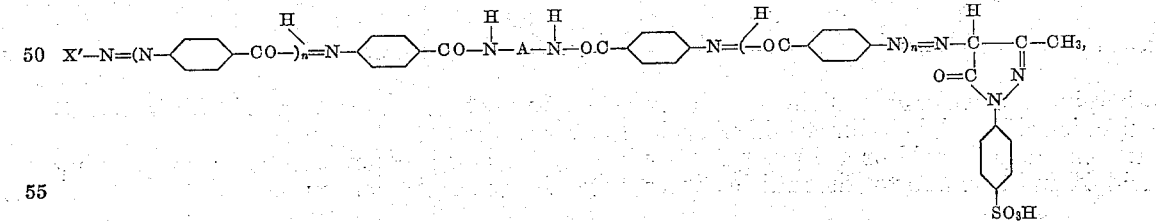

dyeing cotton yellow tints of good fastness to light.

10. As new products the dyes corresponding to the general formula:

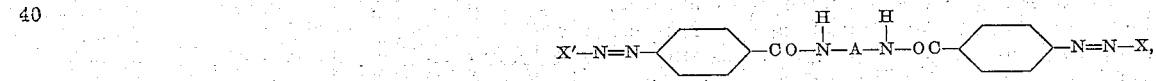

wherein A stands for the radicle of a benzene sulfonic acid, a diphenylurea sulfonic acid, a stilbene sulfonic acid or a diphenyl sulfonic acid and X and X' stand for the radicle of an azo component producing yellow shades of the group consisting of pyrazolones, aceto-acetic anilides, methylketol, salicylic acid, at least one of these end components bearing an acid radicle of the group consisting of $-SO_3H$ and $-COOH$, said dyes dyeing cotton yellow tints of excellent fastness to light.

11. As new products the dyes corresponding to the general formula:

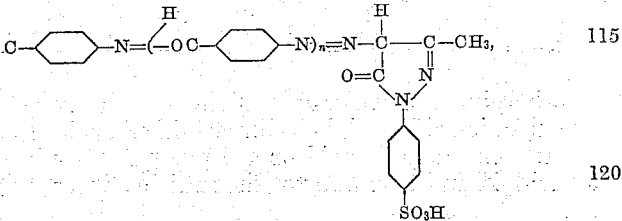

wherein A stands for the radicle of a benzene sulfonic acid, a diphenylurea sulfonic acid, a stilbene sulfonic acid or a diphenyl sulfonic acid, X stands for a pyrazolone radicle and X' stands for the radicle of an azo component producing yellow shades of the group consisting of pyrazolones, aceto-acetic anilides, methylketol, salicylic acid, at least one of these end components bearing an acid radicle of the group consisting of $-SO_3H$ and $-COOH$, said dyes dyeing cotton yellow tints of excellent fastness to light.

12. As new products the dyes corresponding as free acid to the general formula:

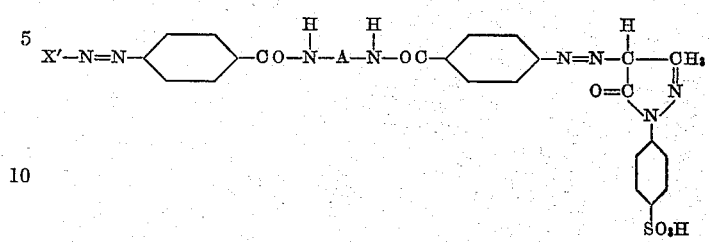

wherein A stands for the radicle of a benzene sulfonic acid, a diphenylurea sulfonic acid, a stilbene sulfonic acid or a diphenyl sulfonic acid and X' stands for the radicle of an azo component producing yellow shades of the group consisting of pyrazolones, aceto acetic anilides, methylketol salicylic acid, said dyes dyeing cotton yellow tints of excellent fastness to light.

13. As a new product the dye which corresponds as free acid to the formula:

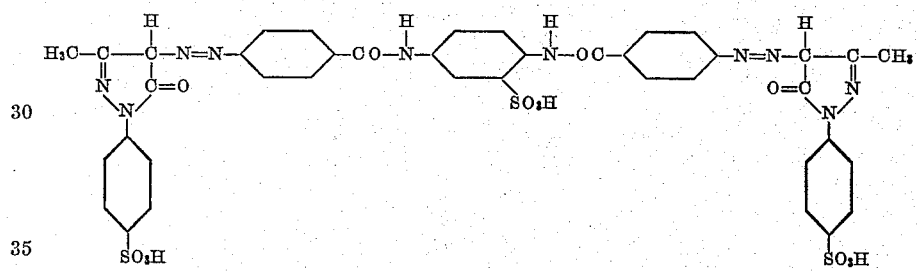

said dye dyeing cotton vivid greenish-yellow tints of excellent fastness to light and to acids.

14. As a new product the dye which corresponds as free acid to the formula:

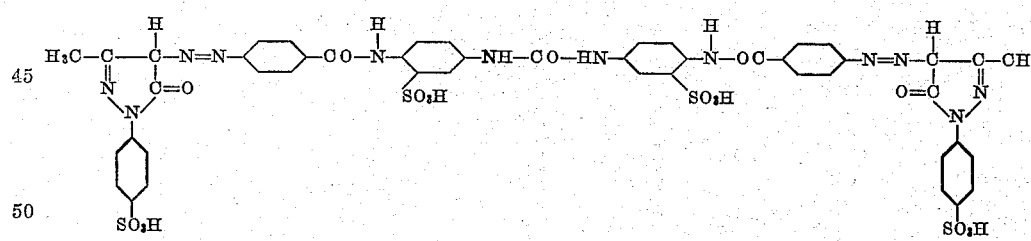

said dye dyeing cotton vivid greenish-yellow tints of excellent fastness to light and to acids.

15. The process which comprises bis-diazotizing one molecular proportion of an aromatic diamine of the general formula:

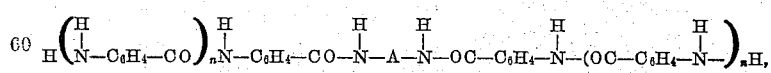

wherein A means a radicle of the benzene or naphthalene series and $n$ means 0 or 1 and coupling the bis-diazo compound with 1.4'-sulfophenyl-3-methyl-5-pyrazolone in a soda-alkaline solution.

16. The process which comprises bis-diazotizing one molecular proportion of 1.4-di-(4'-aminobenzoylamino)-benzene-2-sulfonic acid and coupling the bis-diazo compound with two molecular proportions of 1-(4'-sulfophenyl)-3-methyl-5-pyrazolone in a soda-alkaline solution.

17. The process which comprises bis-diazotizing one molecular proportion of 4.4'-di-(4-aminobenzoylamino)-diphenylurea-3.3'-disulfonic acid and coupling the bis-diazo compound with two molecular proportions of 1-(4'-sulfophenyl)-3-methyl-5-pyrazolone in a soda-alkaline solution.

18. The process which comprises bis-diazotizing one molecular proportion of di-(4-amino-benzoyl-4-aminobenzoyl amino)-stilbene disulfonic acid and coupling the bis-diazo compound with two molecular proportions of 1-(4'-sulfophenyl)-3-methyl-5-pyrazolone in a soda-alkaline solution.

In testimony whereof, I affix my signature.

WERNER LANGE.